May 9, 1950
C. R. BROWN ET AL
AUTOMATIC FIRE EXTINGUISHER FOR
MOTION-PICTURE PROJECTORS
2,506,567
Filed June 12, 1947
2 Sheets-Sheet 2
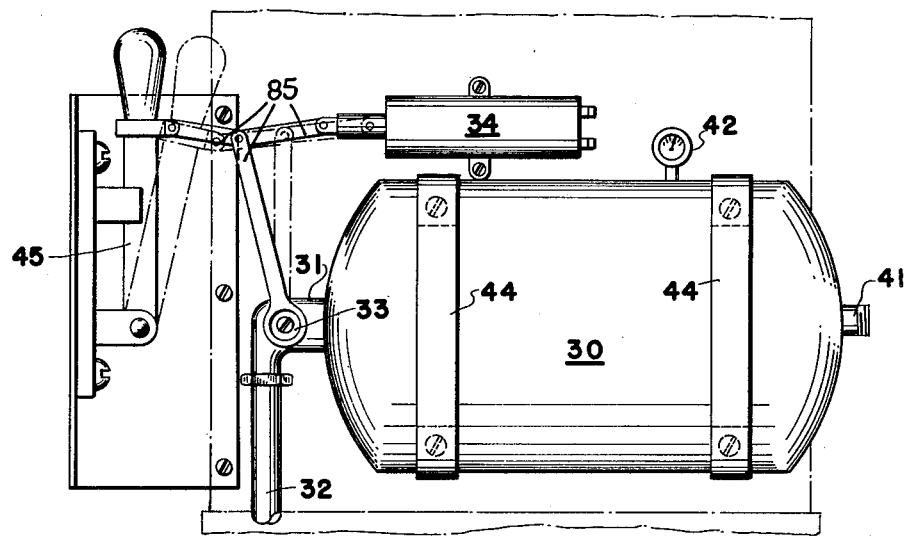
FIG. 3.
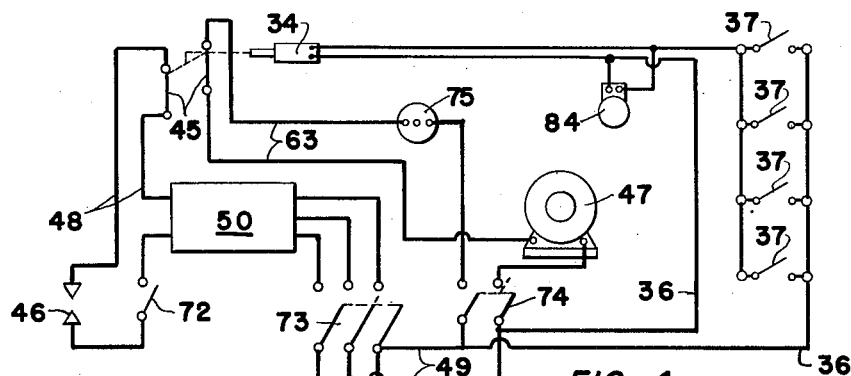
FIG. 4.
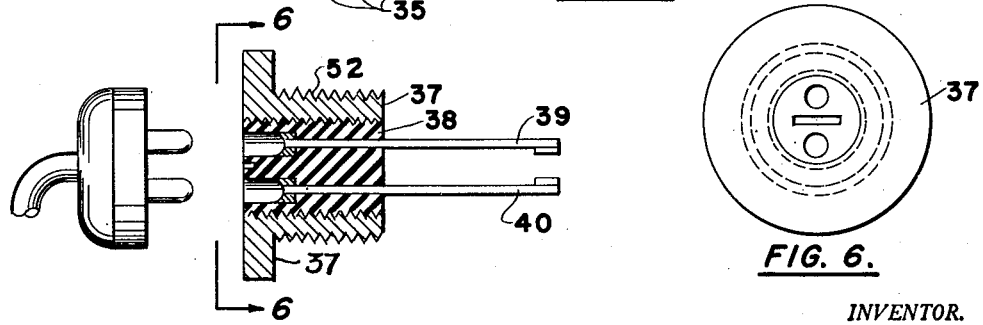
FIG. 5.
FIG. 6.
INVENTOR.
CHARLES R. BROWN
GEORGE W. BERNDT
BY *Howard J. Whelan*

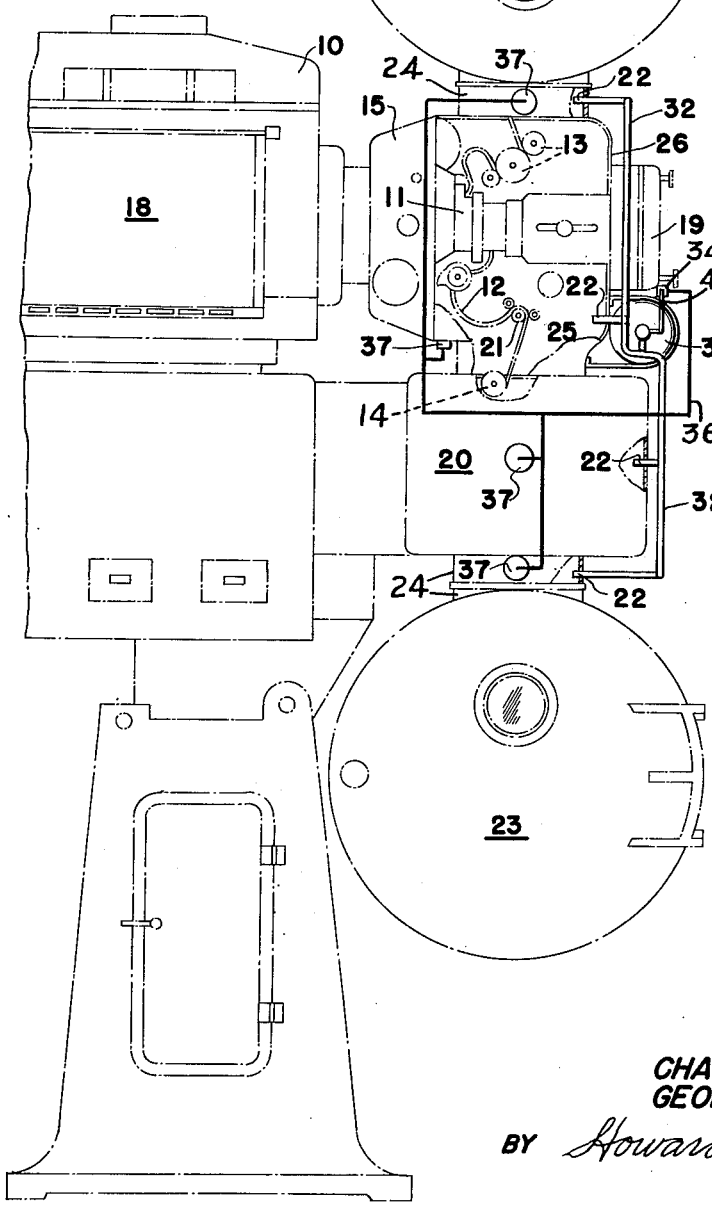

Patented May 9, 1950

2,506,567

UNITED STATES PATENT OFFICE 2,506,567

AUTOMATIC FIRE EXTINGUISHER FOR MOTION-PICTURE PROJECTORS

Charles R. Brown and George W. Berndt, Baltimore, Md.

Application June 12, 1947, Serial No. 754,306

1 Claim. (Cl. 169—2)

This invention relates to moving picture or film projector equipment and more particularly to devices for extinguishing fires or combustion arising and occurring therein.

In the conventional standard size moving picture projector using commercial films, there is an omnipresent danger of the film catching fire from the heat generated therein by the concentrated projected light passing through them on the way to the display screen, on which the pictures of the films are reproduced. This is especially true if the film on a particular machine stops in its travel through the frame before the projecting lens, for a period of a second or two longer than its operating travel usually provides. This period is sufficient to raise the temperature of the film to its combustion point and cause it to blaze up. When this happens the film is liable to flash up and burn through to both the film reels and the fire to get out of control. Various arrangements have been developed to prevent this, among which are those that include automatic barriers to limit the spread of the flame arising in the film to a certain length by clamping against it when on fire; while in another instance, a spring actuates a valve controlling an extinguishing fluid as the film burns. This permits the release of the spring to suit and opens the valve. In these types the operation is relatively slow and the possibility of effective action somewhat uncertain.

It is therefore an object of the present invention, to provide a new and improved extinguishing unit for film projector equipment that will avoid one or more, of the disadvantages and limitations of the prior art.

Another object of this invention is to provide a new and improved unit for extinguishing fire in film projector equipment that will operate expeditiously, effectively and positively, without itself causing appreciable damage thereto in its operation.

A further object of the invention is to provide a new and improved extinguishing unit for film projector equipment that may be readily attached to a conventional moving picture machine without requiring extensive changing in its structure or the arrangement of its parts.

An additional object of this invention is to provide a new and improved film projector equipment that will operate automatically to extinguish the burning action when the film catches fire within the equipment.

Other objects will become apparent as the invention is more fully set forth.

For a better understanding of the invention and the objects thereof, reference is made to the appended drawings and the description following, in which a particular form of the invention is illustrated by way of example, while the scope thereof is emphasized in the claim.

Referring to the drawings:

Figure 1 is a side elevation of a film projector machine embodying this invention;

Figure 2 is a front elevation of Figure 1;

Figure 3 is an enlarged view of the gas tank and emergency switch with the solenoid operating means attached thereto;

Figure 4 is a diagrammatic wiring diagram;

Figure 5 is a side elevation of the thermal switch with parts broken away to show its construction, and Figure 6 is a view looking in the direction of arrows 6—6 of Figure 5.

Similar reference characters refer to similar parts throughout the drawings.

In the construction shown in the drawings, a conventional type of film projector machine 10 includes a film track and frame 11, through which the picture film 12 passes. This film 12 follows through on a series of upper rolls 13 actuated by the driving mechanism 14 of the outfit, and comes from an upper reel in a metal magazine container casing 16. This magazine 16 is attached to the upper portion of the machine 10 and encloses the reel with the film thereon, a door 17 at the side being provided to permit access into it. The door is large enough to permit the insertion and removal of the reel with the film 12 on it. An opening in the bottom of the magazine allows the strip of film to pass through to the frame and track in the projector head 15 and before the optical elements 19 arranged in the line of illumination of a projecting light enclosed in a lamp house 18. The film 12 passes from the track and frame 11 through a space provided with lower rolls 21 on which it is guided to a lower reel in a second container magazine, 23. The manner of driving the upper and lower reels and their alignment follows conventional practice in its design, as do the other incidental parts of the machine concerned, in this projecting machine, with which the invention is combined. The details of the machine and its operation, are therefore not further described in this specification, as it is understood that they are sufficiently well known in the art to make such description unnecessary. However, the magazines 16 and 23 are combined with metal covering 24 encompassing the machine to form a complete housing about the film and reels during its complete travel through and in the machine, and the operational parts that function with it. Inside, a chamber 25 is formed in the projecting head 15 with its front wall 26 aligned with the front of the machine and the mechanism used by the operator.

Attached exteriorly to the front wall 26 is the general structure of an extinguisher unit illustrated particularly in this embodiment of the invention. The unit consists of a cylinder or storage tank 30 filled with carbon-dioxide or carbonic gas, under a pressure of about 25 lbs. per square inch. The cylinder 30 has connections 31 that couple to piping 32 leading to nozzles 22 passing through the wall 26 into the chamber 25 of the projector head 15 and into the spacing in the sound head 20 and upper and lower magazines 16 and 23. The piping has a solenoid operated valve 33 and links 85 controlling the flow of the gas through it. The solenoid 34 is energized from a suitable electrical source 35. Wires 36 suitably connected with this source and the solenoid 34 pass along the housing to one or more thermal switches 37 placed adjacent to the film 12 where it passes into the magazines 16 and 23, the projector head 15 and sound head 20, so that they will be in the line of combustion should the film catch fire or explode. The preferred locations are designated in Figure 1. The structure of the thermal switches 37 preferably consists of a fire resistant block 38 holding a pair of electrodes 39 and 40 parallel to one another, and arranged to make contact to close the circuit of the wires 36 when raised to a temperature above normal, such as the combustion of the film would cause. A conventional diaphragm gas pressure operated thermal switch may be used in the combination if desired. When the circuit 36 is closed, the solenoid 34 operates and opens the valve 33 to let the carbonic gas flow through the piping 32 into the housings 15 and 20 and magazines 16 and 23.

The gas filling the housing under pressure, promptly extinguishes any combustion of the film that may have started and continued up to that moment. The cylinder 30 is provided with customary accessories such as a filling pipe 41, a gauge 42, and is mounted on a framework, that may be readily attached to the housing of the projector framework. A double pole switch 45 controls the direct current service wires 48 going to the projector light 46 and the alternating current circuit 63 to motor 47 that operates the mechanisms moving the film 12 through the machine. This is done to cut off the current and eliminates any operation of the projector during the time that a fire exists, and the incident trouble that such might incur. The switch 45 is operated by the same solenoid 34 that controls the valve 33, which releases the gas from the tank 30 to extinguish the fire.

In the diagram shown in Figure 4, the network used for the operation of the projector consists of a double circuit arrangement in which one is a D. C. line 48 to the arc electrodes used for the projector lamp 46, and the second and A. C. line 63 to the motor 47. Since the service line 35 is generally 220/110 volt A. C. it is rectified through a rectifier 50 for the D. C. circuit 48 provided with switch 72. The 110 volt A. C. circuit 49 is taken off the line 35 to operate the circuits 63 and 36. A switch 73 controls rectifier 50. A main motor switch 74 and operating switch 75 are also provided.

It may be appreciated from the foregoing description, that a fire caused by the film burning will cause the thermal switches 37 to operate and immediately shut off the current to the light 46 and motor 47, while at the same time opening the valve 33 to fill up the various parts of the housing with carbonic gas and extinguish any flames within it effectively. The carbonic gas is not only an effective extinguishing means, but also has no injurious effects on the film or equipment. In other words it does not cause damage itself. It is clean, and even when it passes into the surrounding air it does not cause appreciable inconvenience. It is a product that is commonly available and is relatively inexpensive. It will retain its effective qualities indefinitely when stored in the cylinder. It is light and after leaving the cylinder is in gaseous form, which makes it convenient for the purpose. Other extinguishing mediums and materials are also available, but at the present time the $CO_2$ is particularly suitable, because of the ease afforded in obtaining same readily in the commercial markets. Also the manner of attaching the thermal switches 37 is preferably arranged through the use of a plug 52 that is used with it, that may be readily installed in the projector machine. The manner of coupling up the various circuits used with the device and the projector, can be modified in several ways to suit conditions, if it should be desirable. Those skilled in the art can appreciate this and arrange for it accordingly without involving special ingenuity for the purpose. In the present instance the use of A. C. and D. C. currents in the same equipment is a matter of present practice and is followed in this specification as a matter of conformity therewith, in the example presented. An electric bell 84 is positioned in the circuit 36 and operates to produce an alarm when the switches 37 close and operate the solenoid 34.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

The combination with a motion picture projector having a film housing means, a motor for feeding the film and a light for the projector, of a storage tank containing fire extinguishing gas under pressure, a piping system connecting said tank to the film housing means, a valve controlling said piping, a solenoid for operating said valve, electric circuits for said solenoid and for the film feeding motor and light for the projector, and a plurality of thermostatic elements located along the path of the film in the housing means to close the electric circuit to the solenoid and to open the electric circuits to the film feeding motor and to the light in the projector.

CHARLES R. BROWN.
GEORGE W. BERNDT.

REFERENCES CITED

The following references are of record in the file of this patent:

UNITED STATES PATENTS

| Number | Name | Date |
| --- | --- | --- |
| 1,365,356 | Trantham | Jan. 11, 1921 |
| 1,490,880 | Wright | Apr. 15, 1924 |
| 1,803,859 | MacGregor | May 5, 1931 |

FOREIGN PATENTS

| Number | Country | Date |
| --- | --- | --- |
| 375,545 | Great Britain | June 30, 1932 |